(12) United States Patent
Jenkins et al.

(10) Patent No.: US 10,102,090 B2
(45) Date of Patent: Oct. 16, 2018

(54) NON-DESTRUCTIVE ANALYSIS TO DETERMINE USE HISTORY OF PROCESSOR

(71) Applicant: INTERNATIONAL BUSINESS MACHINES CORPORATION, Armonk, NY (US)

(72) Inventors: Keith A. Jenkins, Sleepy Hollow, NY (US); Barry P. Linder, Hastings-on-Hudson, NY (US); Emily A. Ray, Hastings on Hudson, NY (US); Raphael P. Robertazzi, Ossining, NY (US); Peilin Song, Lagrangeville, NY (US); James H. Stathis, Poughquag, NY (US); Kevin G. Stawiasz, Bethel, CT (US); Franco Stellari, Waldwick, NJ (US); Alan J. Weger, Mohegan Lake, NY (US); Emmanuel Yashchin, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

(21) Appl. No.: 15/156,136

(22) Filed: May 16, 2016

(65) Prior Publication Data
US 2017/0329685 A1   Nov. 16, 2017

(51) Int. Cl.
G06F 11/00   (2006.01)
G06F 11/22   (2006.01)
G06F 11/263  (2006.01)

(52) U.S. Cl.
CPC ...... *G06F 11/2273* (2013.01); *G06F 11/2236* (2013.01); *G06F 11/263* (2013.01)

(58) Field of Classification Search
CPC . G06F 11/2273; G06F 11/2236; G06F 11/263
See application file for complete search history.

(56) References Cited

U.S. PATENT DOCUMENTS

| | | | |
|---|---|---|---|
| 7,474,979 B1 * | 1/2009 | Stevens | G05B 19/41875 438/5 |
| 7,987,442 B2 | 7/2011 | Rajski et al. | |
| 8,028,211 B1 | 9/2011 | Miller et al. | |
| 8,190,953 B2 | 5/2012 | Chakravarthy et al. | |

(Continued)

*Primary Examiner* — Philip Guyton
(74) *Attorney, Agent, or Firm* — Tutunjian & Bitetto, P.C.; Jennifer R. Davis

(57) ABSTRACT

A method and system are provided for chip testing. The method includes ascertaining a baseline for a functioning chip with no stress history by performing a non-destructive test procedure on the functioning chip. The method further includes repeating the test procedure on a chip under test using a threshold derived from the baseline as a reference point to determine a stress history of the chip under test. The test procedure includes ordering each of a plurality of functional patterns by a respective minimum operating period corresponding thereto, ranking each pattern based on at least one preceding available pattern to provide a plurality of pattern ranks, and calculating a sum by summing the pattern ranks. The sum calculated by the ascertaining step is designated as the baseline, and the sum calculated by the repeating step is compared to the threshold to determine the stress history of the chip under test.

20 Claims, 13 Drawing Sheets

(56) References Cited

U.S. PATENT DOCUMENTS

| | | |
|---|---|---|
| 8,689,066 B2 | 4/2014 | Grady et al. |
| 2004/0025123 A1 | 2/2004 | Angilivelil |
| 2004/0216061 A1 | 10/2004 | Floyd et al. |
| 2006/0161828 A1* | 7/2006 | Lin .................. G01R 31/31835 714/738 |
| 2006/0267621 A1* | 11/2006 | Harris ................ G01R 31/2884 324/762.02 |
| 2008/0234967 A1* | 9/2008 | Vandewiele ....... G01R 31/3172 702/119 |
| 2010/0088560 A1* | 4/2010 | Chakravarthy .. G01R 31/31718 714/724 |
| 2012/0136603 A1* | 5/2012 | Ishikawa .......... G01R 31/31919 702/85 |
| 2013/0007546 A1* | 1/2013 | Grady ............. G01R 31/31835 714/726 |
| 2014/0088947 A1 | 3/2014 | Anemikos et al. |
| 2017/0269151 A1* | 9/2017 | Favi .................. G01R 31/2856 |

\* cited by examiner

| Subset of functional patterns | Pattern ID |
|---|---|
| Shift left logical | 1 |
| Divide | 2 |
| Subtract | 3 |
| Exclusive OR | 4 |
| Floating point divide | 5 |
| Floating point substract | 6 |

FIG. 3

| Pattern ID | Pmin (ns) |
|---|---|
| 1 | 6.55 |
| 2 | 7.15 |
| 3 | 6.56 |
| 4 | 7.40 |
| 5 | 6.50 |
| 6 | 6.40 |

| Pattern ranks |
|---|
| < STOP \| 4 > = 1 |
| < 4 \| 2 > = 1 |
| < 2 \| 3 > = 1 |
| < 3 \| 1 > = 1 |
| < 1 \| 5 > = 1 |
| < 5 \| 6 > = 1 |
| < 6 \| * > = 1 |

| Pattern ID | Pmin (ns) |
|---|---|
| 1 | 9.35 |
| 2 | 8.00 |
| 3 | 9.45 |
| 4 | 8.50 |
| 5 | 8.75 |
| 6 | 8.80 |

| Pattern ranks |
|---|
| < STOP \| 3 > = 0 |
| < 3 \| 1 > = 1 |
| < 1 \| 6 > = 0 |
| < 6 \| 5 > = 0 |
| < 5 \| 4 > = 0 |
| < 4 \| 2 > = 1 |
| < 2 \| * > = 0 |

FIG. 12

NON-DESTRUCTIVE ANALYSIS TO DETERMINE USE HISTORY OF PROCESSOR

STATEMENT REGARDING FEDERALLY SPONSORED RESEARCH OR DEVELOPMENT

This invention was made with Government support under Contract No.: HR0011-11-C-0060 awarded by the Defense Advanced Research Projects Agency (DARPA). The Government has certain rights in this invention.

BACKGROUND

Technical Field

The present invention generally relates to processors, and more particularly to non-destructive analysis to determine use history of a processor.

Description of the Related Art

A common type of chip counterfeiting is to resell used chips that have passed the acceptable degradation threshold. However, all current techniques to determine the effect of stress history on a single chip are destructive. Furthermore, regular reliability tests cannot be implemented unless there is a large batch of chips with the same stress history. Thus, there is a need for non-destructive technique to determine use history of a processor.

SUMMARY

According to an aspect of the present principles, a method is provided for chip testing. The method includes ascertaining a baseline for a functioning chip with no stress history by performing a non-destructive test procedure on the functioning chip. The method further includes repeating the non-destructive test procedure on a chip under test using a threshold derived from the baseline as a reference point to determine a stress history of the chip under test. The non-destructive test procedure includes ordering each of a plurality of functional patterns by a respective minimum operating period corresponding thereto, ranking each of the plurality of patterns based on at least one preceding available pattern to provide a plurality of pattern ranks, and calculating a sum by summing the plurality of pattern ranks. The sum calculated by the ascertaining step is designated as the baseline, and the sum calculated by the repeating step is compared to the threshold to determine the stress history of the chip under test.

According to another aspect of the present principles, a non-transitory computer readable storage medium is provided. The non-transitory computer readable storage medium includes a computer readable program for chip testing. The computer readable program when executed on a computer causes the computer to perform a method. The method includes ascertaining a baseline for a functioning chip with no stress history by performing a non-destructive test procedure on the functioning chip. The method further includes repeating the non-destructive test procedure on a chip under test using a threshold derived from the baseline as a reference point to determine a stress history of the chip under test. The non-destructive test procedure includes ordering each of a plurality of functional patterns by a respective minimum operating period corresponding thereto, ranking each of the plurality of patterns based on at least one preceding available pattern to provide a plurality of pattern ranks, and calculating a sum by summing the plurality of pattern ranks. The sum calculated by the ascertaining step is designated as the baseline, and the sum calculated by the repeating step is compared to the threshold to determine the stress history of the chip under test.

According to yet another embodiment of the present principles, a system is provided for chip testing. The system includes an evaluation processor configured to ascertain, in a baseline establishing stage, a baseline for a functioning chip with no stress history by performing a non-destructive test procedure on the functioning chip. The evaluation processor is further configured to repeat, in a testing stage, the non-destructive test procedure on a chip under test using a threshold derived from the baseline as a reference point to determine a stress history of the chip under test. The non-destructive test procedure includes ordering each of a plurality of functional patterns by a respective minimum operating period corresponding thereto, ranking each of the plurality of patterns based on at least one preceding available pattern to provide a plurality of pattern ranks, and calculating a sum by summing the plurality of pattern ranks. The sum calculated in the baseline establishing stage is designated as the baseline, and the sum calculated in the testing stage is compared to the threshold to determine the stress history of the chip under test.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 3 shows an exemplary subset of six functional patterns for use in both the processor baseline establishing stage and the processor testing stage, in accordance with an embodiment of the present principles;

FIG. 6 shows the six functional patterns of FIG. 3 with ranks in the processor baseline establishing stage, in accordance with an embodiment of the present principles;

FIG. 10 shows an exemplary minimum operating period for each of the six functional patterns of FIG. 3 in the processor testing stage, in accordance with an embodiment of the present principles;

FIG. 12 shows the six functional patterns of FIG. 3 with ranks in the processor testing stage, in accordance with an embodiment of the present principles.

DETAILED DESCRIPTION

The present principles are directed to a non-destructive analysis to determine the use history of a processor. It is to be appreciated that the terms "processor" and "chip" are used interchangeably herein.

In an embodiment, a non-destructive method is provided to determine if a chip's stress (use) history is significant enough to affect its future performance.

In an embodiment, the present principles involve the use of a set of functional patterns of a chip to determine the stress state of the chip. It is to be appreciated that different patterns have different sets of transistors that are used, which should give each pattern a unique timing signature. Hence, in an embodiment, the order of the minimum operation periods of a subset of functional patterns is determined and compared to an accepted standard to determine the chip's stress state.

As a chip is stressed, especially if it is stressed heavily or non-uniformly, the order of the minimum operating period of each pattern will change. Accordingly, when a chip's order deviates from an accepted standard, it is classified as an anomalous chip that has either been stressed before or will have bad future degradation performance. Thus, the present principles advantageously measure the prior use of a processor by looking at a pattern order with respect to timing for a specific set of patterns in order to find slow-downs or reordering of one or more of the patterns which would indicate stress.

Advantages of this technique include the ability to detect chips that should be discarded for previous heavy use, and those with poorly performing critical paths. Also, since this is not a destructive analysis, chips that have no stress history remain viable for use. Implementation is fast, allowing all received chips to be tested instead of a subset, if desired. Furthermore, the analysis is flexible enough to allow adjustable amounts of deviation from the accepted standard without discarding a chip, as needed.

Figure 1:
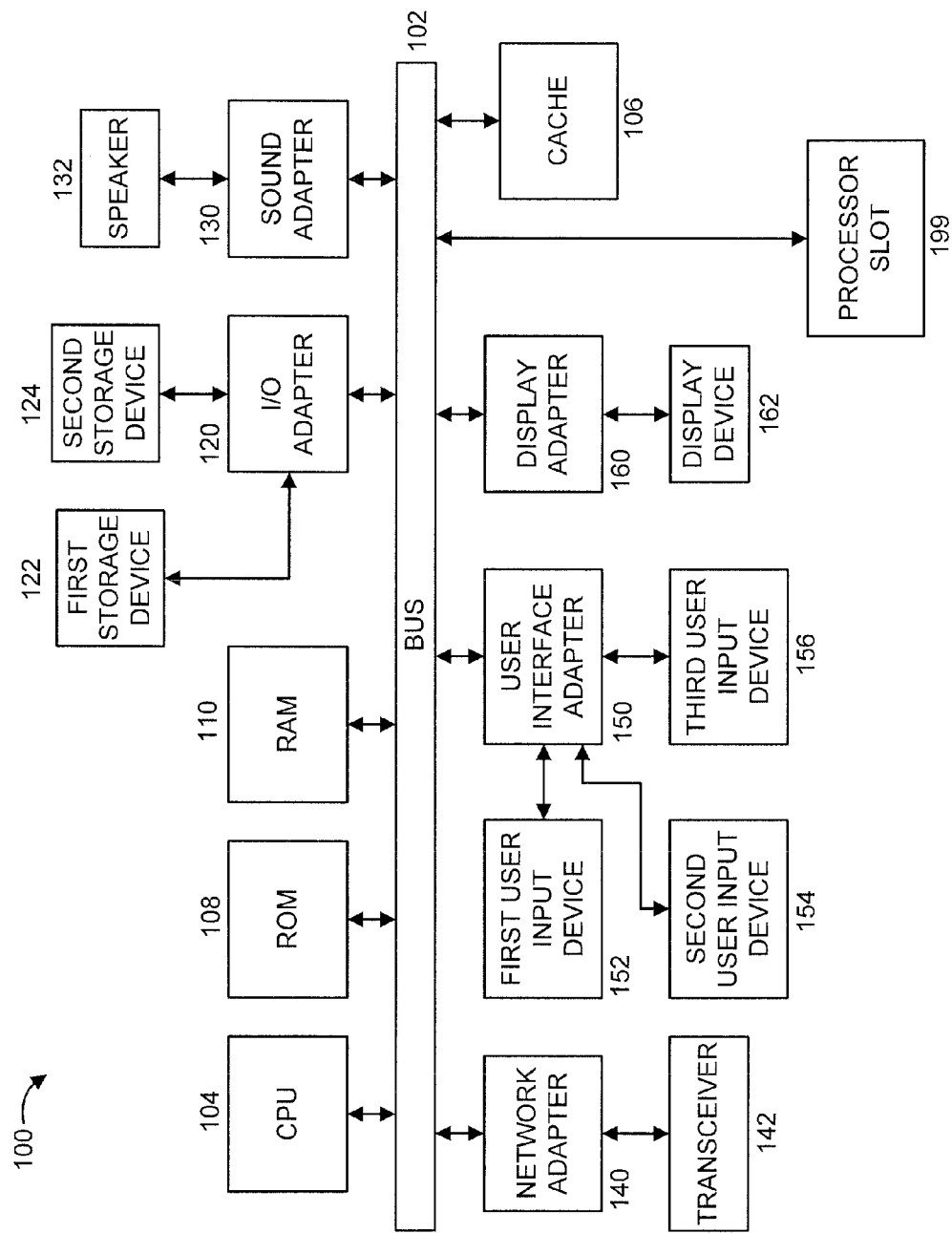
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 is interchangeably referred to herein as a processor testing system.

The processing system 100 includes at least one processor (CPU) (interchangeably referred to herein as "evaluation processor") 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

The processing system further includes a processor/chip slot 199 for receiving processors/chips for which respective baselines are to be established and for receiving processors/chips for non-destructive testing in accordance with the present principles.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

FIGS. 2 and 7-9 show various stages of implementing a non-destructive analysis to determine use history of a processor. In particular, FIG. 2 pertains to a processor baseline establishing stage, and FIGS. 7-9 pertains to a processor testing stage. As is evident to one of ordinary skill in the art, different processors will be used for the different stages, wherein the processor baseline establishing stage will involve a new or unstressed processor, while the processor testing phase will involve a processor to be tested in order to determine the stress history of the processor.

Figure 2:
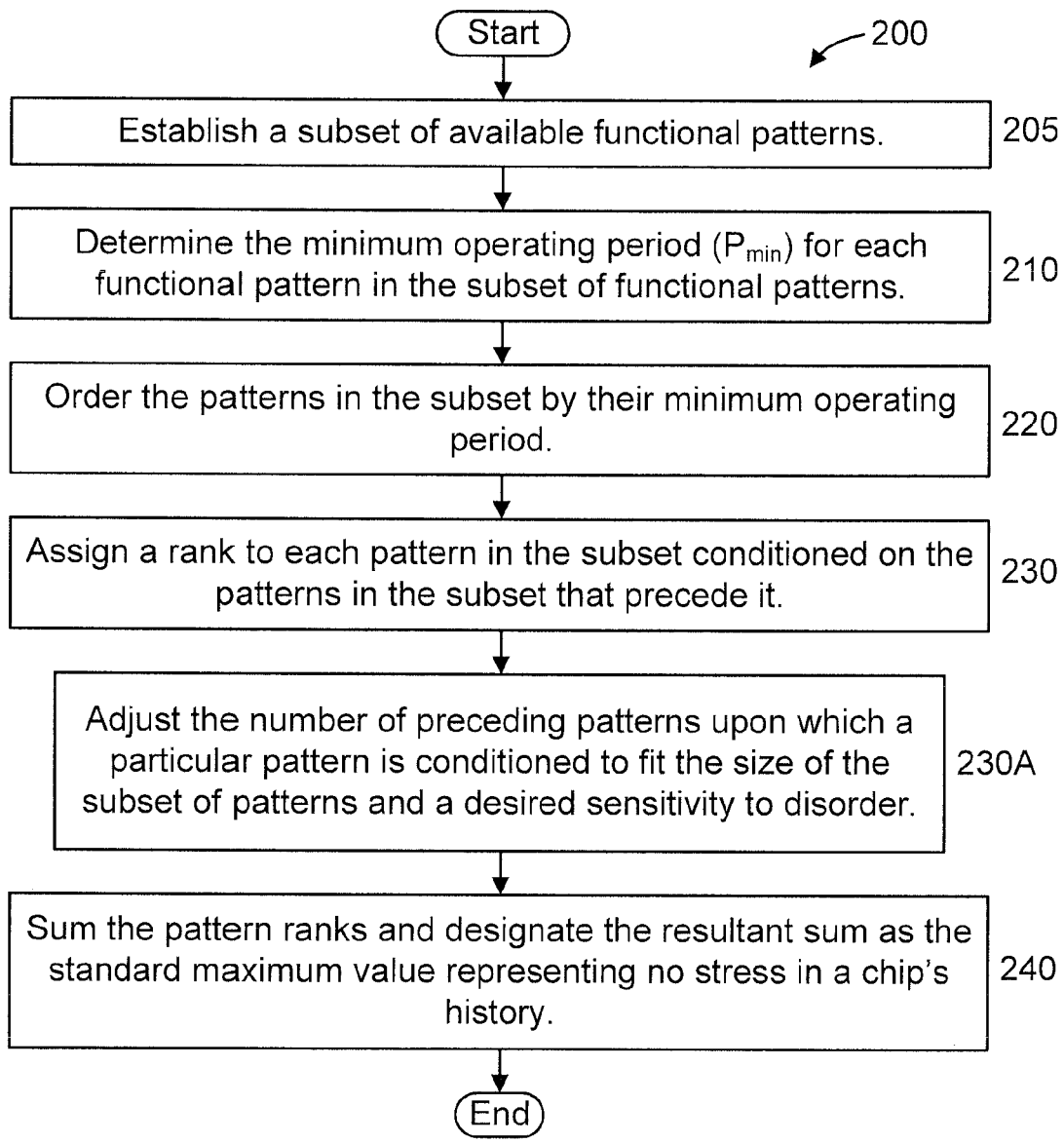
FIG. 2 shows an exemplary method for setting up a non-destructive analysis to determine use history of a processor, in accordance with an embodiment of the present principles.

FIG. 2 shows an exemplary method 200 for setting up a non-destructive analysis to determine use history of a processor, in accordance with an embodiment of the present principles. That is, method 200 is directed to determining a baseline for a functioning chip with no stress history, for future comparison when performing an actual non-destructive analysis of a processor.

At step 205, establish a subset of available functional patterns (hereinafter "functional patterns"). FIG. 3 shows an exemplary subset 300 of six functional patterns for use in both the processor baseline establishing stage and the processor testing stage, in accordance with an embodiment of the present principles. FIG. 3 also shows the identifiers (IDs) of the six functional patterns, which are consecutive integers in this example, but can be represented by any character or representation. The six functional patterns include shift left logical, divide, subtract, exclusive OR, floating point divide, and floating point subtract. It is to be appreciated that the preceding functional patterns are merely illustrative and, thus, other functional patterns can also be used in accordance with the teachings of the present principles, while maintaining the spirit of the present principles.

Figure 4:
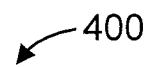
FIG. 4 shows an exemplary minimum operating period for each of the six functional patterns of FIG. 3 in the processor baseline establishing stage, in accordance with an embodiment of the present principles.

At step 210, determine the minimum operating period ($P_{min}$) for each functional pattern in the subset of functional patterns. FIG. 4 shows an exemplary minimum operating period 400 for each of the six functional patterns 300 of FIG. 3 in the processor baseline establishing stage, in accordance with an embodiment of the present principles. In FIG. 4, the minimum operating period 400 is shown in nanoseconds (ns). Of course, different units of time can also be used, while maintaining the spirit of the present principles.

Figure 5:
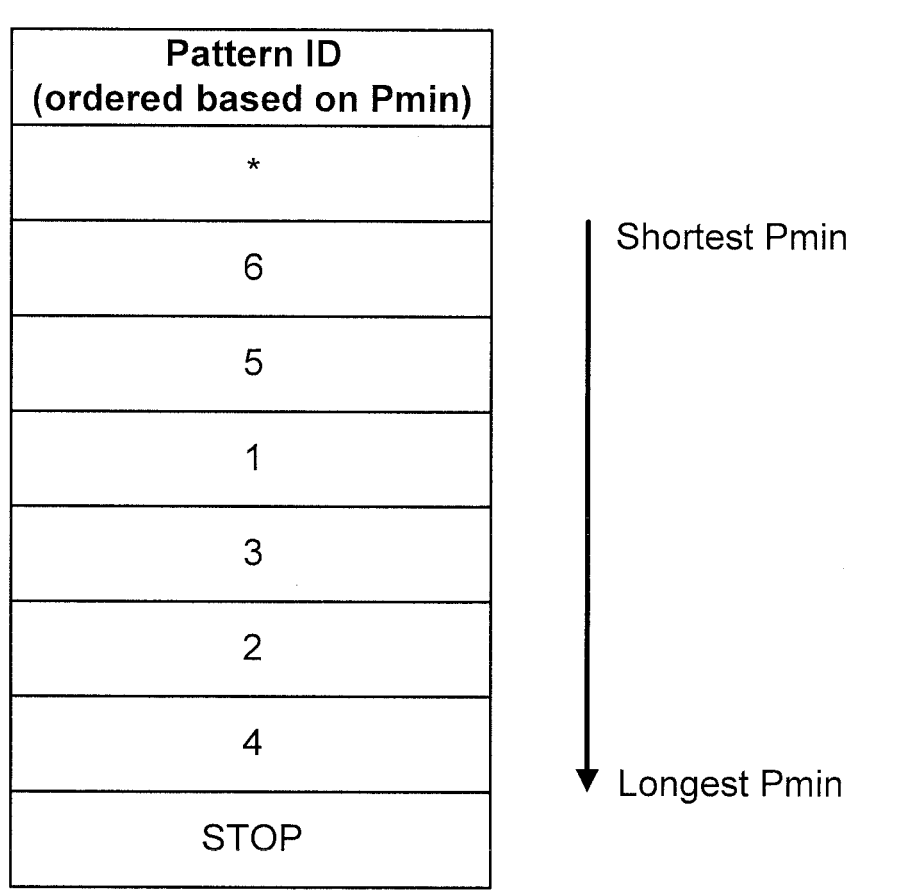
FIG. 5 shows an ordering of the six functional patterns of FIG. 3 by their minimum operating period in the processor baseline establishing stage, in accordance with an embodiment of the present principles.

At step 220, order the patterns in the subset by their minimum operating period. FIG. 5 shows an ordering 500 of the six functional patterns 300 of FIG. 3 by their minimum operating period 400 in the processor baseline establishing stage, in accordance with an embodiment of the present principles.

At step 230, assign a rank to each pattern in the subset conditioned on the patterns in the subset that precede it. The rank is either a 1 or a 0 for each pattern and includes a starting (*) pattern and an ending (STOP) pattern. The starting (*) pattern represents an imaginary pattern with an operating period less than the minimum period of any of the tested patterns and the ending (STOP) pattern represents an imaginary pattern with an operating period greater than the minimum period of any of the tested patterns. The * and STOP symbols denote the beginning and end of the sequence, respectively. Their presence allows the patterns with the shortest and longest minimum period to be included in the ranking process in the same manner as the other patterns. When establishing the baseline, all ranks are 1. FIG. 6 shows the six functional patterns 300 of FIG. 3 with ranks 610 in the processor baseline establishing stage, in accordance with an embodiment of the present principles. The total of the ranks 610 in FIG. 6 is equal to 7.

In an embodiment, step 230 includes step 230A.

At step 230A, adjust the number of preceding patterns upon which a particular pattern is conditioned to fit the size of the subset of patterns and a desired sensitivity to disorder.

At step 240, sum the pattern ranks and designate the resultant sum as the standard maximum value representing no stress in a chip's history.

Figure 7:
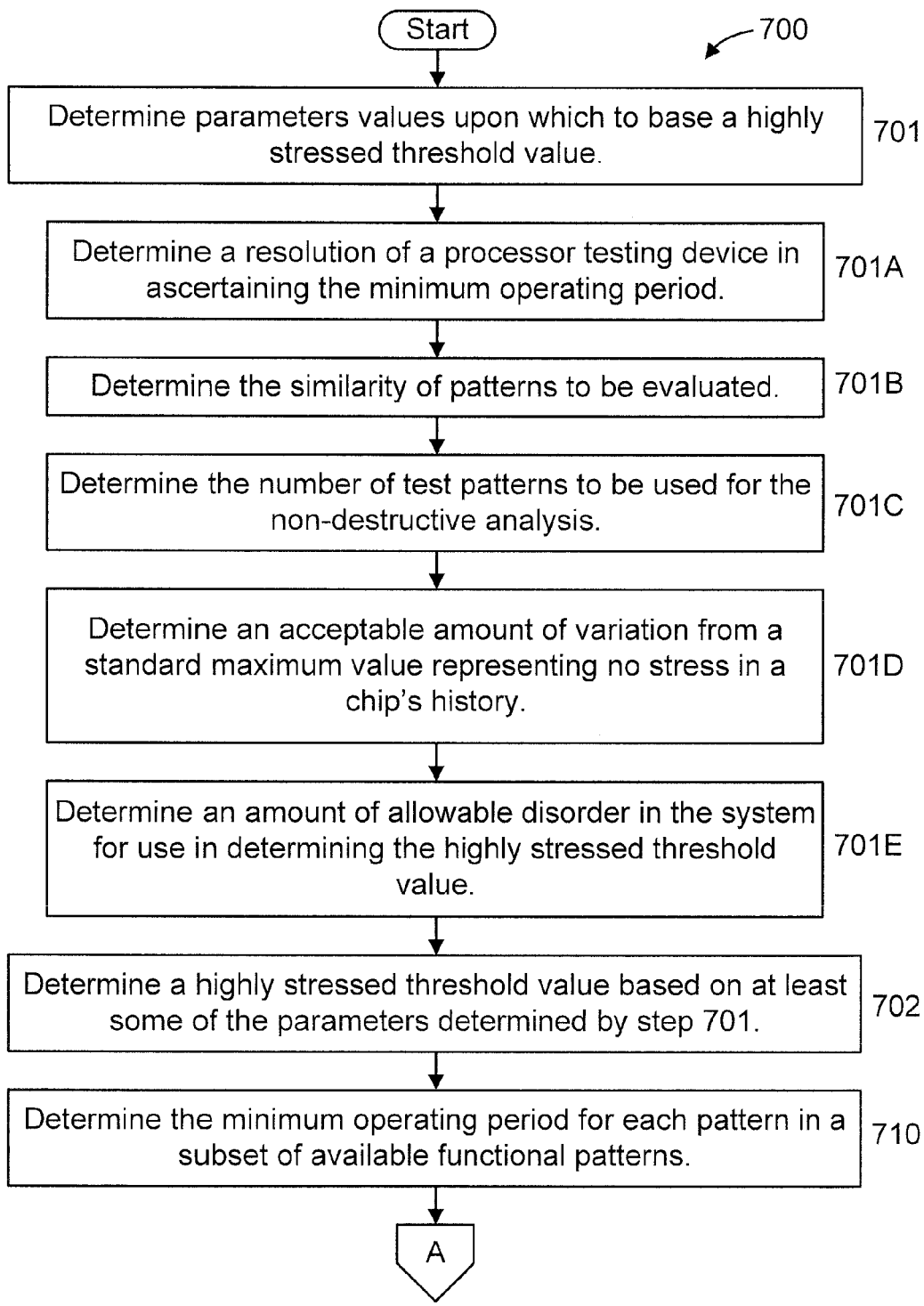
FIGS. 7-9 show an exemplary method for non-destructive analysis to determine use history of a processor, in accordance with an embodiment of the present principles.
Figure 8:
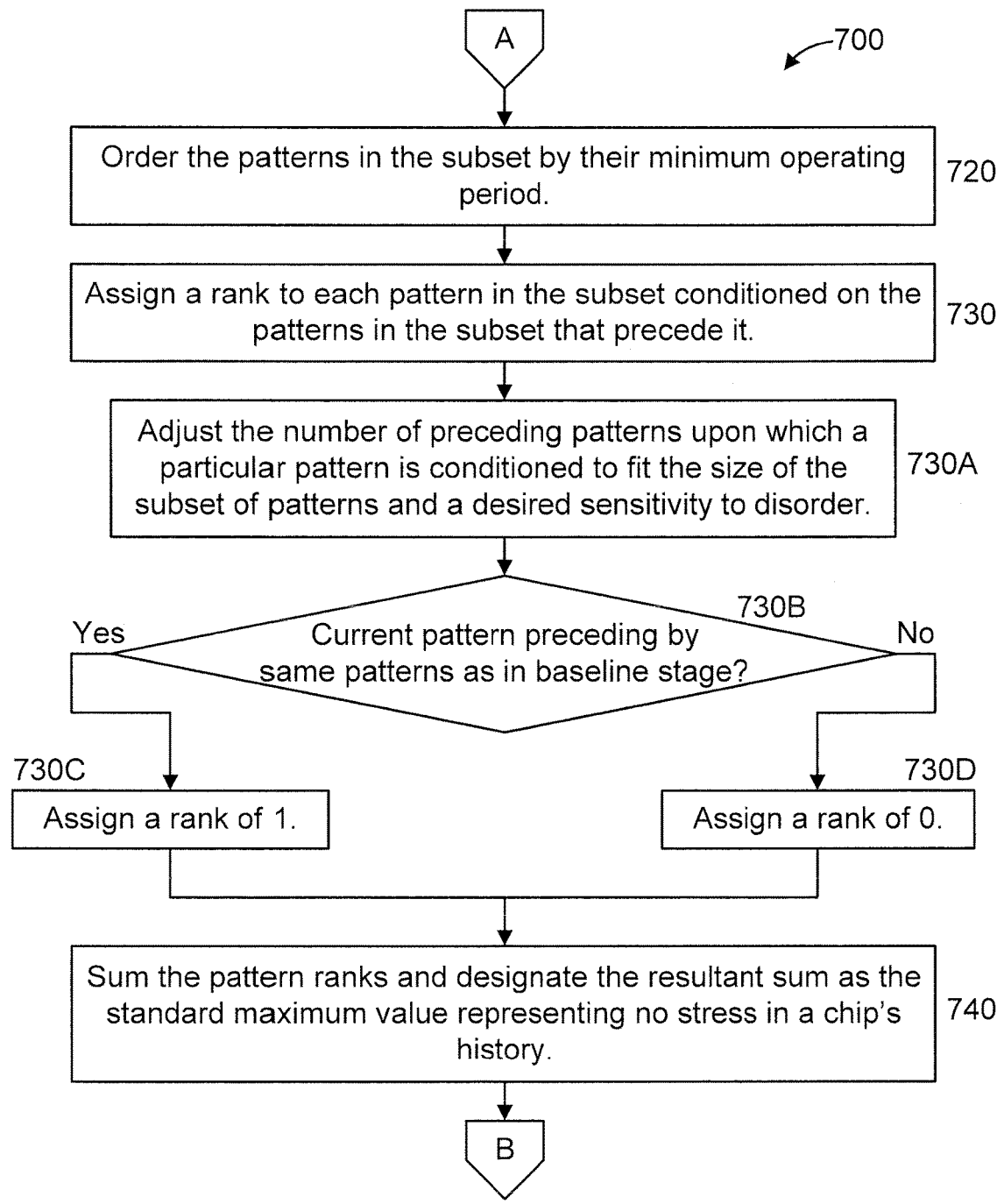
Figure 9:
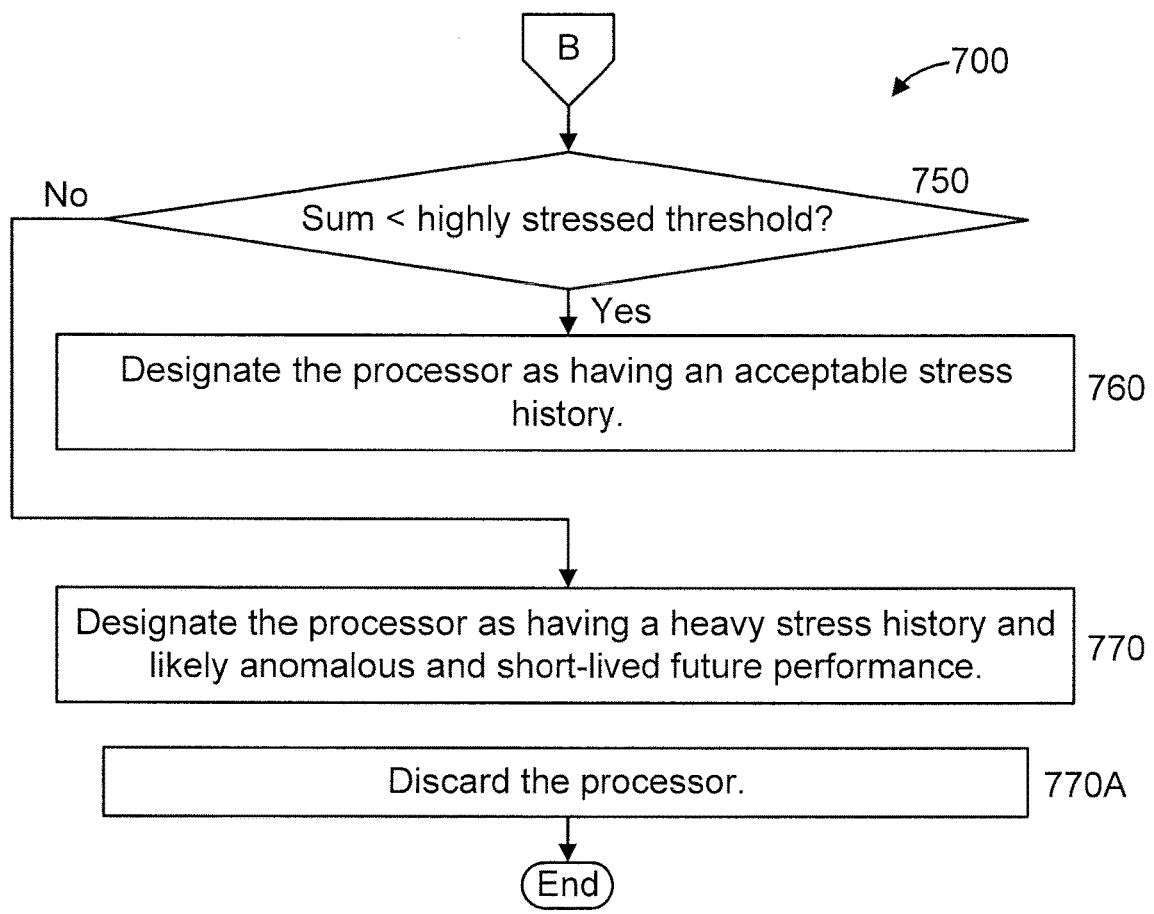

FIGS. 7-9 show an exemplary method 700 for non-destructive analysis to determine use history of a processor, in accordance with an embodiment of the present principles. That is, method 700 is directed to actually testing a particular processor to determine the use history of the particular processor using the non-destructive analysis described herein.

At step 701, determine parameters values upon which to base a highly stressed threshold value.

In an embodiment, step 701 includes steps 701A through 701E.

At step 701A, determine a resolution of a processor testing device in ascertaining the minimum operating period.

At step 701B, determine the similarity of patterns to be evaluated.

At step 701C, determine the number of test patterns to be used for the non-destructive analysis.

At step 701D, determine an acceptable amount of variation from a standard maximum value representing no stress in a chip's history.

At step 701E, determine an amount of allowable disorder in the system for use in determining the highly stressed threshold value.

At step 702, determine a highly stressed threshold value based on at least some of the parameters determined by step 701. In the specific example spanning FIGS. 3-6 and 10-13, the following applies for the sake of illustration:
 perfectly ordered chip rank=7
 perfectly unordered chip rank=0
 threshold rank=4,
where the threshold rank of 4 corresponds to a switch between 2 non-nearest neighbor patterns, rather than a small fluctuation that could contribute to nearest neighbor switches.

At step 710, determine the minimum operating period for each pattern in a subset of available functional patterns. FIG. 10 shows an exemplary minimum operating period 1000 for each of the six functional patterns 300 of FIG. 3 in the processor testing stage, in accordance with an embodiment of the present principles. In FIG. 10, the minimum operating period 1000 is shown in nanoseconds (ns). Of course, different units of time can also be used, while maintaining the spirit of the present principles.

Figure 11:
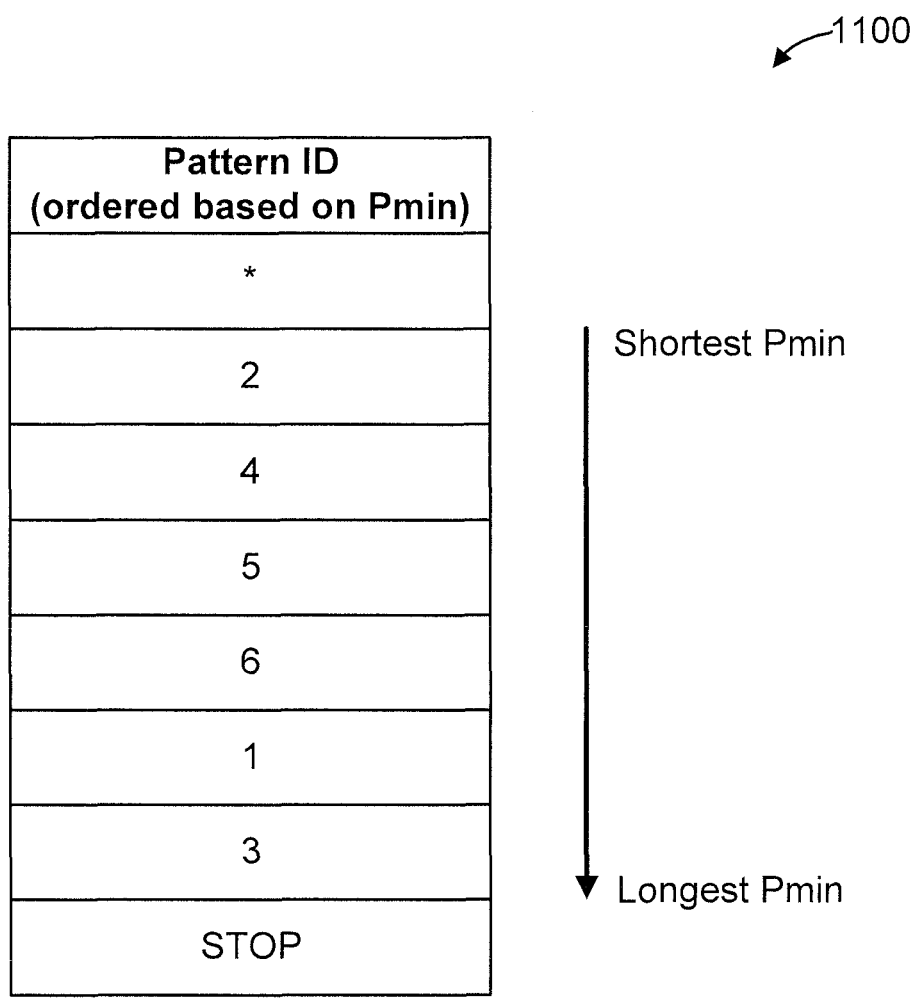
FIG. 11 shows an ordering of the six functional patterns of FIG. 3 by their minimum operating period in the processor testing stage, in accordance with an embodiment of the present principles.

At step 720, order the patterns in the subset by their minimum operating period. FIG. 11 shows an ordering 1100 of the six functional patterns 300 of FIG. 3 by their minimum operating period 1000 in the processor testing stage, in accordance with an embodiment of the present principles.

At step 730, assign a rank to each pattern in the subset conditioned on the patterns in the subset that precede it. The rank is either a 1 or a 0 for each pattern and includes a starting (*) pattern and an ending (STOP) pattern. If a given pattern is not preceded by any of the patterns in the baseline processor testing stage that preceded that pattern at the processor testing stage, then that pattern's rank is 0 (as per step 730C below). FIG. 12 shows the six functional patterns 300 of FIG. 3 with ranks 1210 in the processor testing stage, in accordance with an embodiment of the present principles. The total of the ranks 1210 in FIG. 12 is equal to 2.

In an embodiment, step 730 includes step 730A.

At step 730A, adjust the number of preceding patterns upon which a particular pattern is conditioned to fit the size of the subset of patterns and a desired sensitivity to disorder. The number of preceding patterns conditioned on for the test case must be the same as the number conditioned on for the baseline case in order for the threshold comparison to be valid.

At step 730B, determine whether a current pattern being ranked is preceded by the patterns in the baseline (method 200). If so, then proceed to step 730C. Otherwise, proceed to step 730D.

At step 730C, assign a rank of 1 to the current pattern.

At step 730D, assign a rank of 0 to the current pattern.

At step 740, sum the pattern ranks and designate the resultant sum as the standard maximum value representing no stress in a chip's history.

Figure 13:
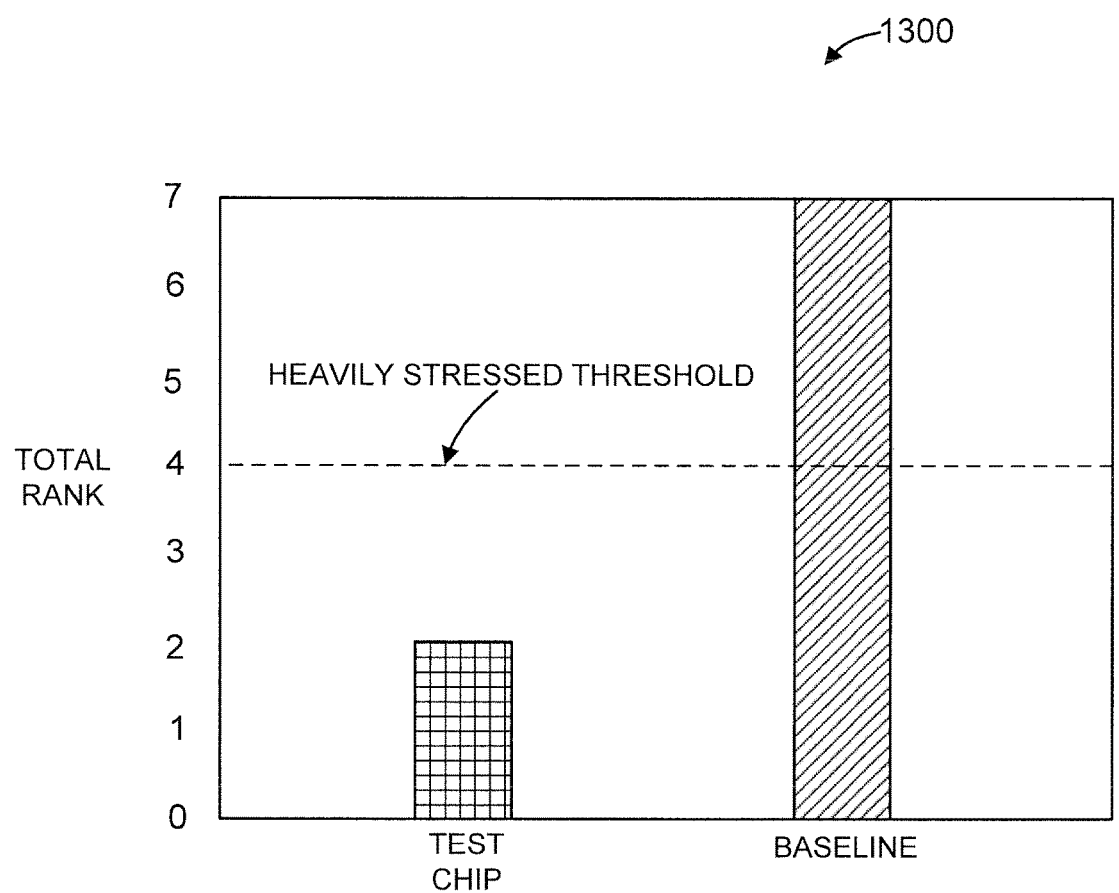
FIG. 13 shows a representation of the standard maximum value compared to the baseline and the highly stressed threshold value, in accordance with an embodiment of the present principles.

At step 750, determine whether the sum is less than (<) the highly stressed threshold value. If so, then continue to step 760. Otherwise, continue to step 770. FIG. 13 shows a representation 1300 of the standard maximum value compared to the baseline (standard maximum value, representing no stress in a chip's history) and the highly stressed threshold value, in accordance with an embodiment of the present principles. In FIG. 13, the standard maximum value is shown using a checkboard hatch pattern, while the baseline is shown using a diagonal hatch pattern.

At step 760, designate the processor as having an acceptable stress history. In an embodiment, the processor may be designated as usable. In an embodiment, the processor may be installed in an actual device that employs (includes) a processor. In an embodiment, the present principles can be employed in an automated assembly process, where the processor is automatically installed in a device once the device is designated as having an acceptable stress history.

At step 770, designate the processor as having a heavy stress history and likely anomalous and short-lived future performance. In an embodiment, the processor may be designated as unusable.

In an embodiment, step 770 includes step 770A.

At step 770A, discard the processor.

Further regarding ranking, as performed in step 230 of FIG. 2 and step 730 of FIG. 7, it is to be appreciated that the ranking methodology can be varied based on the number of patterns tested, the sensitivity of the chip to degradation, and so forth. In an embodiment, a switch of two patterns who are close in timing can be penalized less heavily than a switch in the first pattern and the last pattern. As an example, it is noted that since there were only six patterns in the exemplary set of functional patterns shown in FIG. 3, only one nearest neighbor in one direction is taken into account. However, other numbers of neighbors can be considered depending upon the implementation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for chip testing, comprising:
    ascertaining a baseline for a functioning chip with no stress history by performing a non-destructive test procedure on the functioning chip;
    repeating the non-destructive test procedure on a chip under test using a threshold derived from the baseline as a reference point to determine a stress history of the chip under test;
    selectively deploying the chip under test for future use or discarding the chip under test to prevent the future use, responsive to the stress history of the chip under test,
    wherein the non-destructive test procedure comprises:
        ordering each of a plurality of functional patterns by a respective minimum operating period corresponding thereto;
        ranking each of the plurality of patterns based on at least one preceding available pattern to provide a plurality of pattern ranks; and
        calculating a sum by summing the plurality of pattern ranks,
    wherein the sum calculated by said ascertaining step is designated as the baseline, and the sum calculated by said repeating step is compared to the threshold to determine the stress history of the chip under test.

2. The method of claim 1, wherein each of the plurality of pattern ranks comprises a rank for a current one of the plurality of patterns being ranked, and further comprises a starting pattern and an ending pattern, the starting pattern representing an imaginary pattern having an operating period less than the respective minimum operating period of all of the plurality of patterns, and the ending pattern representing an imaginary pattern having the operating period greater than the respective minimum operating period of all of the plurality of patterns.

3. The method of claim 1, wherein each of the plurality of ranks is specified in a binary format.

4. The method of claim 3, wherein the plurality of ranks comprises more than two ranks.

5. The method of claim 1, wherein said ascertaining step corresponds to a baseline establishing stage and the repeating step corresponds to a testing stage,
    wherein, for said baseline establishing phase, all of the plurality of ranks are set to one, and
    wherein, for said testing stage, any of the plurality of ranks for a given one of the plurality of patterns that is preceded by a different pattern in the testing stage versus the baseline establishing stage are set to zero.

6. The method of claim 1, wherein the threshold is determined based on threshold selection criteria selected from the group consisting of a total number of the plurality of patterns used in the method, a resolution of a test device in determining the minimum operating period, a similarity between the plurality of patterns, and an acceptable variation between the baseline and the sum calculated by said repeating step.

7. The method of claim 1, wherein said ranking step uses a ranking methodology that varies with a total number of the plurality of patterns used in the method and a sensitivity of the functional chip and the chip under test.

8. The method of claim 1, wherein said ascertaining step corresponds to a baseline establishing stage and the repeating step corresponds to a testing stage, and a ranking methodology used in the baseline establishing stage is different than a ranking methodology used in the testing stage.

9. A non-transitory computer readable storage medium comprising a computer readable program for chip testing, wherein the computer readable program when executed on a computer causes the computer to perform the steps of:

ascertaining a baseline for a functioning chip with no stress history by performing a non-destructive test procedure on the functioning chip; and repeating the non-destructive test procedure on a chip under test using a threshold derived from the baseline as a reference point to determine a stress history of the chip under test;

selectively deploying the chip under test for future use or discarding the chip under test to prevent the future use, responsive to the stress history of the chip under test, wherein the non-destructive test procedure comprises:
   ordering each of a plurality of functional patterns by a respective minimum operating period corresponding thereto;
   ranking each of the plurality of patterns based on at least one preceding available pattern to provide a plurality of pattern ranks; and
   calculating a sum by summing the plurality of pattern ranks, wherein the sum calculated by said ascertaining step is designated as the baseline, and the sum calculated by said repeating step is compared to the threshold to determine the stress history of the chip under test.

10. The non-transitory computer readable storage medium of claim 9, wherein each of the plurality of pattern ranks comprises a rank for a current one of the plurality of patterns being ranked, and further comprises a starting pattern and an ending pattern, the starting pattern representing an imaginary pattern having an operating period less than the respective minimum operating period of all of the plurality of patterns, and the ending pattern representing an imaginary pattern having the operating period greater than the respective minimum operating period of all of the plurality of patterns.

11. The non-transitory computer readable storage medium of claim 9, wherein each of the plurality of ranks is specified in a binary format.

12. The non-transitory computer readable storage medium of claim 11, wherein the plurality of ranks comprises more than two ranks.

13. The non-transitory computer readable storage medium of claim 9, wherein said ascertaining step corresponds to a baseline establishing stage and the repeating step corresponds to a testing stage,
   wherein, for said baseline establishing phase, all of the plurality of ranks are set to one, and
   wherein, for said testing stage, any of the plurality of ranks for a given one of the plurality of patterns that is preceded by a different pattern in the testing stage versus the baseline establishing stage are set to zero.

14. The non-transitory computer readable storage medium of claim 9, wherein the threshold is determined based on threshold selection criteria selected from the group consisting of a total number of the plurality of patterns used in the method, a resolution of a test device in determining the minimum operating period, a similarity between the plurality of patterns, and an acceptable variation between the baseline and the sum calculated by said repeating step.

15. The non-transitory computer readable storage medium of claim 9, wherein said ranking step uses a ranking methodology that varies with a total number of the plurality of patterns used in the method and a sensitivity of the functional chip and the chip under test.

16. The non-transitory computer readable storage medium of claim 9, wherein said ascertaining step corresponds to a baseline establishing stage and the repeating step corresponds to a testing stage, and a ranking methodology used in the baseline establishing stage is different than a ranking methodology used in the testing stage.

17. A system for chip testing, comprising:
   an evaluation processor configured to:
      ascertain, in a baseline establishing stage, a baseline for a functioning chip with no stress history by performing a non-destructive test procedure on the functioning chip; and
      repeat, in a testing stage, the non-destructive test procedure on a chip under test using a threshold derived from the baseline as a reference point to determine a stress history of the chip under test;
      selectively deploy the chip under test for future use or discard the chip under test to prevent the future use, responsive to the stress history of the chip under test,
   wherein the non-destructive test procedure comprises ordering each of a plurality of functional patterns by a respective minimum operating period corresponding thereto, ranking each of the plurality of patterns based on at least one preceding available pattern to provide a plurality of pattern ranks, and calculating a sum by summing the plurality of pattern ranks, and
   wherein the sum calculated in the baseline establishing stage is designated as the baseline, and the sum calculated in the testing stage is compared to the threshold to determine the stress history of the chip under test.

18. The system of claim 17, wherein each of the plurality of ranks is specified in a binary format.

19. The system of claim 18, wherein the plurality of ranks comprises more than two ranks.

20. The system of claim 17, wherein the threshold is determined based on threshold selection criteria selected from the group consisting of a total number of the plurality of patterns used in the method, a resolution of a test device in determining the minimum operating period, a similarity between the plurality of patterns, and an acceptable variation between the baseline and the sum calculated by said repeating step.

* * * * *